(12) United States Patent
Falk et al.

(10) Patent No.: US 9,197,615 B2
(45) Date of Patent: Nov. 24, 2015

(54) METHOD AND SYSTEM FOR PROVIDING ACCESS-SPECIFIC KEY

(75) Inventors: Rainer Falk, Erding (DE); Günther Horn, München (DE); Dirk Kröselberg, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1913 days.

(21) Appl. No.: 12/310,198

(22) PCT Filed: Aug. 9, 2007

(86) PCT No.: PCT/EP2007/058284
§ 371 (c)(1),
(2), (4) Date: Sep. 7, 2010

(87) PCT Pub. No.: WO2008/019989
PCT Pub. Date: Feb. 21, 2008

(65) Prior Publication Data
US 2011/0010538 A1    Jan. 13, 2011

(30) Foreign Application Priority Data
Aug. 14, 2006 (DE) .......................... 10 2006 038 037

(51) Int. Cl.
*H04L 9/08* (2006.01)
*H04L 29/06* (2006.01)
*H04W 12/04* (2009.01)
*H04W 88/06* (2009.01)
(Continued)

(52) U.S. Cl.
CPC ................ *H04L 63/06* (2013.01); *H04L 63/08* (2013.01); *H04L 63/0884* (2013.01); *H04W 12/04* (2013.01); *H04W 12/06* (2013.01); *H04W 80/045* (2013.01); *H04W 88/06* (2013.01)

(58) Field of Classification Search
USPC ......................................................... 380/278
See application file for complete search history.

(56) References Cited

U.S. PATENT DOCUMENTS

| 7,350,077 | B2 | 3/2008 | Meier et al. |
| 7,475,241 | B2 * | 1/2009 | Patel et al. ..................... 713/155 |
| 2002/0120844 | A1 * | 8/2002 | Faccin et al. ................... 713/168 |

(Continued)

FOREIGN PATENT DOCUMENTS

| CN | 1503595 A | 6/2004 |
| CN | 1714560 A | 12/2005 |

(Continued)

OTHER PUBLICATIONS

C. Perkins, "IP Mobility Support for IPv4"; RFC 3344; Network Working Group; Aug. 2002; pp. 1-99.

(Continued)

*Primary Examiner* — Michael Chao
(74) *Attorney, Agent, or Firm* — Staas & Halsey LLP (57) ABSTRACT

An access specific key is provided for securing of a data transfer between a mobile terminal and a node of an access net. For authentication of the mobile terminal, a authentication server generates a session key, from which a basic key is derived and transferred to an interworking-proxy-server. The interworking-proxy-server derives the access specific key from the transferred basis key and provides the key to the node of the access net.

16 Claims, 8 Drawing Sheets

(51) Int. Cl.
*H04W 12/06* (2009.01)
*H04W 80/04* (2009.01)

(56) References Cited

U.S. PATENT DOCUMENTS

2005/0025091 A1    2/2005  Patel et al.
2006/0161771 A1    7/2006  Zhang

FOREIGN PATENT DOCUMENTS

JP    2005-210639    8/2005
WO    2004/049672 A2    6/2004

OTHER PUBLICATIONS

Perkins, "IP Mobility Support"; RFC 2002; Network Working Group; Oct. 1996; pp. 1-71.
S. Glass et al.; "Mobile IP Authentication, Authorization, and Accounting Requirements"; RFC 2977; Network Working Group; Oct. 2000; pp. 1-27.
IEEE Standard 802.16-2001 for Location and Metropolitan Area Networks, Part 16: Air Interface for Fixed Broadband Wireless Access Systems; Apr. 2002; pp. i-xxvi, 1-322.
D. Johnson et al.; "Mobility Support in IPv6"; RFC 3775; Network Working Group; Jun. 2004; pp. 1-165.
F. Johansson et eal.; "Mobile IPv4 Extension for Carrying Network Access Identifiers"; RFC 3846; Network Working Group; Jun. 2004; pp. 1-8.
J. Arkko et al.; "Using IPsec to Protect Mobile IPv6 Signaling Between Mobile Nodes and Home Agents"; RFC 3776; Network Working Group; Jun. 2004; pp. 1-40.
C. Perkins et al.; Authentication, Authorization, and Accounting (AAA) Registration Keys for Mobile IPv4; RFC 3957; Network Working Group; Mar. 2005, pp. 1-27.
A. Patel et al.; "Authentication Protocol for Mobile IPv6"; RFC 4285; Network Working Group; Jan. 2006; pp. 1-19.
B. Aboba et al.; "Extensible Authentication Protocol (EAP) Key Management Framework"; EAP Working Group; Jun. 2006; printed from tools.ief.org/id/draft-ietf-eap-keyring-14.txt on Nov. 13, 2008; pp. 1-52.
"3rd Generation Partnership Project; Technical Specification Group Service and System Aspects; 3G Security; Wireless Local Area Network (WLAN) Interworking Security (Release 7)"; 3GPP TS 33.234 V7.1.0; Jun. 2006; pp. 1-93.
M. Nakhjiri et al.; "EAP based Proxy Mobile IP Key Bootstrapping: A WiMAX applicability example"; Feb. 2006; printed from www.watersprings.org/pub/id/draft-hakhjiri-pmip-key-02.txt on Nov. 13, 2008; pp. 1-10.
International Search Report for Application No. PCT/EP2007/058284; mailed Nov. 28, 2007.
Office Action issued Sep. 12, 2012 in corresponding Chinese Patent Application No. 200780030180.6.

\* cited by examiner

FIG 1  Prior art

Mobility binding table

| Home Address | Care/of Address | Lifetime (ms) |
|---|---|---|
| 131.192.180.42 | 129.142.23.42 | 100 |
| 213.123.24.140 | 172.23.142.49 | 150 |
| ... | ... | ... |

FIG 2  Prior art

Visitor list

| Home Address | Home Agent Address | Media Address | Lifetime |
|---|---|---|---|
| 131.192.180.42 | 129.142.23.42 | 08-00-46-26-75-6A | 100 |
| 213.123.24.140 | 172.23.142.49 | 00-02-B3-77-43-00 | 150 |
| ... | ... | ... | ... |

METHOD AND SYSTEM FOR PROVIDING ACCESS-SPECIFIC KEY

CROSS REFERENCE TO RELATED APPLICATIONS

This application is based on and hereby claims priority to German Application No. 10 2006 038 037.1 filed on Aug. 14, 2006, the contents of which are hereby incorporated by reference.

BACKGROUND

The invention relates to a method and a system for providing an access-specific key for securing a data transfer between a mobile terminal and a node of an access network.

With the TCP/IP protocol, the Internet offers a platform for the development of higher-level protocols for the mobile sector. Since the Internet protocols are widely used, a large group of users can be tapped into by upgrading the protocols appropriately for mobile environments. The known Internet protocols were not, however, originally designed for mobile use. In known Internet packet switching, the packets are exchanged between stationary computers which neither change their network address nor roam between various subnetworks. In radio networks connecting mobile terminals and computers, mobile computers MS (mobile stations) are frequently integrated into various networks. With the aid of an appropriate server, DHCP (Dynamic Host Configuration Protocol) makes it possible for an IP address and further configuration parameters to be assigned dynamically to a computer in a network. A computer which is integrated into a network is automatically assigned a free IP address by the DHCP protocol. If a mobile computer has DHCP installed, it has only to come within range of a local network which supports the configuration via the DHCP protocol. With the DHCP protocol, dynamic address allocation is possible, i.e. a free IP address is automatically allocated for a defined period. After this period has expired, either the request has to be resubmitted by the mobile computer MS or the IP address can be allocated elsewhere.

With DHCP, a mobile computer MS can be integrated into a network without being configured manually. The only requirement is that a DHCP server be available. In this way, a mobile computer MS can use services of the local network and, for example, use files stored centrally. However, if a mobile computer MS offers services itself, a potential service user is unable to locate the mobile computer MS since its IP address changes in each network into which the mobile computer is integrated. The same happens if an IP address changes during an existing TCP connection. This leads to the connection being interrupted. With Mobile IP, a mobile computer MS is therefore assigned an IP address which it also retains in a different network. When switching IP network conventionally, it is necessary to adapt the IP address settings appropriately. Constant adaptation of the IP and known automatic configuration mechanisms interrupts the existing connection when the IP address is switched. The MIP protocol (RFC2002, RFC2977, RFC3344, RFC3846, RFC3957, RFC3775, RFC3776, RFC4285) supports the mobility of mobile terminals MS. With the known IP protocols, the mobile terminal MS has to adapt its IP address each time it switches IP subnetwork in order for the data packets addressed to the mobile terminal MS to be routed correctly. In order to maintain an existing TCP connection, the mobile terminal MS has to retain its IP address, as a switch of address will lead to an interruption of the connection. The MIP protocol enables a transparent connection between the two addresses, namely a permanent home address and a second temporary care/of address. The care/of address is the particular IP address at which the mobile terminal MS can currently be reached.

A home agent HA is a proxy of the mobile terminal MS, for as long as the mobile terminal MS is not located in the original home network. The home agent is continuously informed about the current whereabouts of the mobile computer MS. The home agent HA is normally a component of a router in the mobile terminal's home network. When the mobile terminal MS is located outside the home network, the home agent HA provides a function in order that the mobile terminal MS can log on. The home agent HA then forwards the data packets addressed to the mobile terminal MS to the current subnetwork of the mobile terminal MS.

A foreign agent FA is located in the subnetwork in which the mobile terminal MS is moving. The foreign agent FA forwards incoming data packets to the mobile terminal MS or to the mobile computer MS. The foreign agent FA is located in a so-called visited network. The foreign agent FA is also normally a component of a router. The foreign agent FA routes all administrative mobile data packets between the mobile terminal MS and its home agent HA. The foreign agent FA unpacks the tunneled IP data packets sent by the home agent HA and forwards the data therein to the mobile terminal MS.

The home address of the mobile terminal MS is an address at which the mobile terminal MS can be reached permanently. The home address has the same address prefix as the home agent HA. The care/of address is the particular IP address which the mobile terminal MS uses in the visited network.

The home agent HA maintains a so-called mobility binding table (MBT). The entries in this table serve in assigning the two addresses, i.e. the home address and the care/of address, of a mobile terminal MS to one another and in rerouting the data packets correspondingly.

Figure 1:
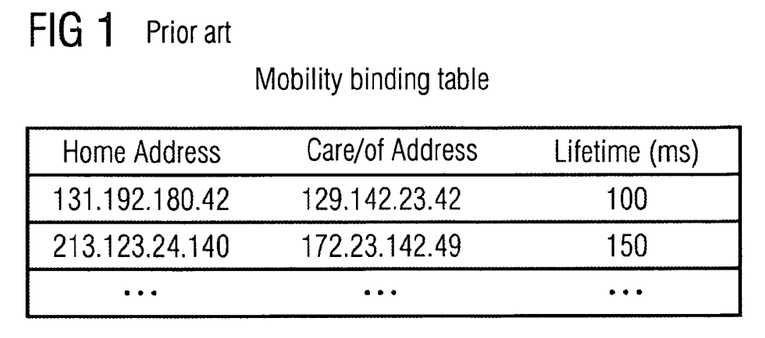
FIG. 1 is a mobility binding table according to the related art.

The MBT table contains entries concerning the home address, the care/of address and a specification of the time span during which this assignment is valid (lifetime). FIG. 1 shows an example of a mobility binding table MBT according to the related art.

Figure 2:
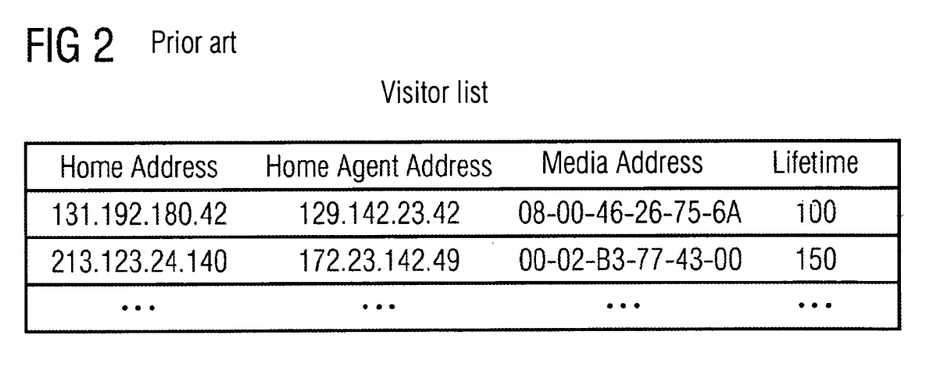
FIG. 2 is a visitor list according to the related art.

The foreign agent FA contains a visitor list (VL) which contains information about the mobile terminals NS which are currently located in the IP network of the foreign agent FA. FIG. 2 shows an example of this type of visitor list according to the related art.

In order for a mobile computer NS to be integrated into a network, it must firstly ascertain whether it is located in its home network or a visited network. In addition, the mobile terminal MS has to ascertain which computer in the subnetwork is the home agent and the foreign agent. This information is determined through so-called agent discovery.

The subsequent registration enables the mobile terminal MS to communicate its current location to its home agent HA. To do this, the mobile computer or the mobile terminal MS sends the current care/of address to the home agent. To register, the mobile computer MS sends a registration request to the home agent. The home agent HA enters the care/of address into its list and responds with a registration reply. There is, however, a security problem here. Since in principle any computer can send a registration request to a home agent HA, it could easily be simulated to a home agent HA that a computer had moved into a different network. In this way, a foreign computer could acquire all the data packets of a mobile computer or mobile terminal MS without a sender finding out. In order to prevent this, the mobile computer MS and the home agent HA have shared secret keys. If a mobile computer MS returns to its home network, it deregisters with the home agent HA as the mobile computer MS can now receive all data packets itself. A mobile radio network must have the following security characteristics inter alia. Information must be made accessible only to desired communication partners, i.e. undesired eavesdroppers must not be given access to transferred data. The mobile radio network must therefore have the characteristic of confidentiality. Besides this, authenticity must be a given. Authenticity allows a communication partner to establish beyond doubt whether a communication has actually been set up to a desired communication partner or whether a foreign party is posing as the communication partner. Authentications can be carried out for each message or for each connection. Where authentication is carried out on a connection basis, the communication partner is identified once only at the start of a session. It is then assumed for the remaining course of the session that the messages which follow continue to originate from the corresponding sender. Even where the identity of a communication partner is established, i.e. the communication partner is authenticated, the case can arise where this communication partner may not access all resources or may not use all services via the network. In this case, a corresponding authorization requires prior authentication of the communication partner.

In mobile data networks, messages have to cover longer pathways via air interfaces and are consequently more easily accessible to potential hackers. In mobile and wireless data networks, security aspects therefore play a special role. Encryption techniques represent a key way for increasing security in data networks. Through encryption, it is possible to transfer data over insecure communication pathways, for example over air interfaces, without unauthorized third parties gaining access to the data. For encryption, the data, i.e. the so-called plaintext, has to be transformed with the aid of an encryption algorithm into ciphertext. The encrypted text can be transported over the insecure data transmission channel and then decrypted or deciphered.

WiMax (Worldwide Interoperability for Microwave Access), a highly promising wireless access technology, is being proposed as a new standard which uses IEEE 802.16 for radio transmission. Using WiMax, transmitting stations are intended to supply a range of up to 50 km at data rates of over 100 Mbit per second.

Figure 3:
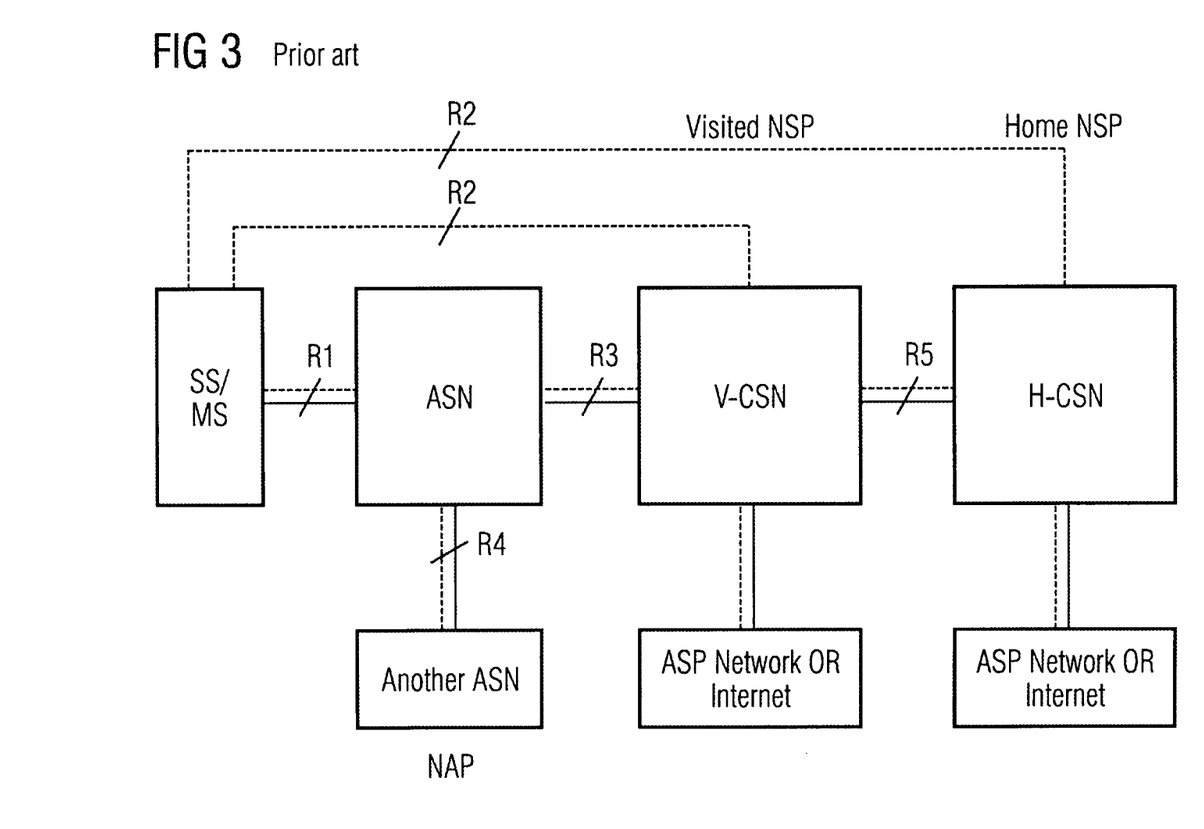
FIG. 3 is a block diagram of a reference model for a WiMax radio network.

FIG. 3 shows a reference model for a WiMax radio network. A mobile terminal MS is located within the range of an access network (ASN: access serving network). The access network ASN is connected via at least one visited network (visited connectivity service network VCSN) or intermediate network to a home network HCSN (home connectivity service network). The various networks are connected to one another via interfaces or reference points R. The home agent HA of the mobile station MS is located in the home network (HCSN) or in one of the visited networks (VCSN).

WiMax supports two implementation variants of Mobile Internet Protocol (MIP), namely a so-called client MIP (CMIP), in which the mobile station MS itself implements the MIP client function, and proxy MIP (PMIP), in which the MIP client function is implemented by the WiMax access network ASN. The functionality provided for this purpose in the ASN is called a proxy mobile node (PMN) or PMIP client. Therefore, MIP can also be used with mobile stations MS which do not themselves support MIP.

Figure 4:
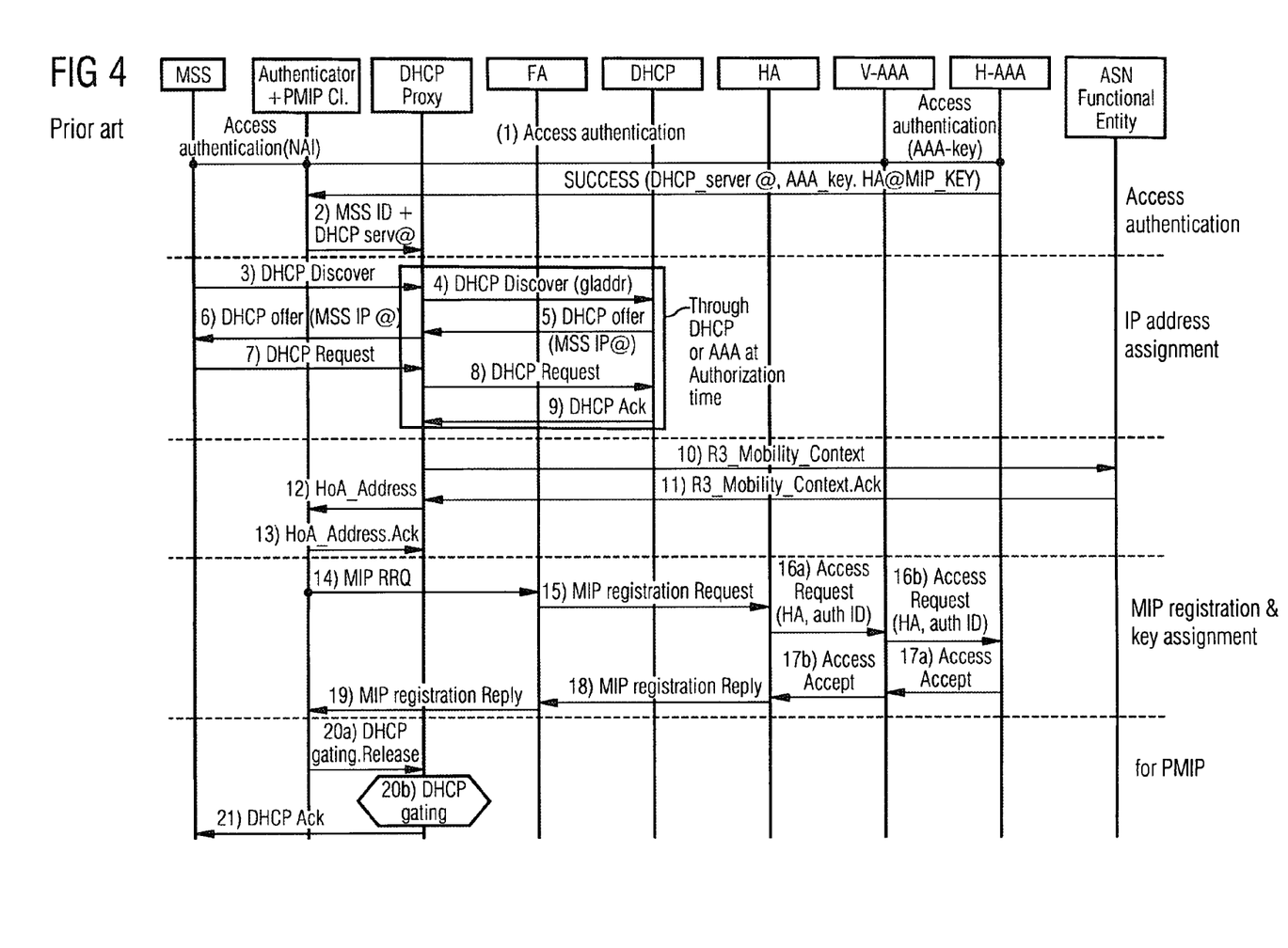
FIG. 4 is a signal diagram of a connection setup using Proxy Mobile IP (PMIP) according to the related art.

FIG. 4 shows the setting up of a connection by proxy MIP (PMIP), when the home agent HA is located in the visited network VCSN, according to the related art.

After a radio connection has been set up between the mobile terminal MS and a base station BS, an access authentication is carried out firstly. The function of authentication, authorization and accounting is carried out by so-called AAA servers (AAA: authentication, authorization and accounting). Authentication messages are exchanged between the mobile terminal MS and the AAA server of the home network (HAAA), by which messages the address of the home agent HA and an authentication key are obtained. The authentication server in the home network contains the profile data of the subscriber. The AAA server receives an authentication request message which contains a subscriber identity of the mobile terminal. Following successful access authentication, the AAA server generates an MSK key (MSK: master session key) to protect the data transfer pathway between the mobile terminal MS and the base station BS of the access network ASN. This MSK key is transmitted from the AAA server of the home network via the intermediate network CSN to the access network ASN.

After access authentication, the DHCP proxy server in the access network ASN is configured, as can be seen from FIG. 4. If the IP address and host configuration is already contained in the AAA reply message, all the information is downloaded into the DHCP proxy server.

After successful authentication and authorization, the mobile station or the mobile terminal MS sends a DHCP discovery message and assignment of an IP address takes place.

If a mobile terminal MS is integrated into a network, the mobile terminal MS will possibly have to ascertain whether it is located in a home network or a visited network. Furthermore, the mobile terminal MS must ascertain which computer is in the respective network of the home agent or the foreign agent. This information is determined through so-called agent discovery. There are two types of agent discovery, namely agent advertisement and agent solicitation.

In agent advertisement, the agents, i.e. the home or foreign agents, periodically send broadcast messages to all the computers and mobile terminals of the subnetwork. Any computer which eavesdrops on the broadcast messages within a defined period can thus identify the agents in the respective subnetwork.

When a mobile terminal MS is reactivated, it is not generally practical to wait for the next agent advertisement. The mobile terminal MS has to know immediately in what subnetwork it is currently located. Using so-called agent solicitation, the mobile terminal MS therefore sends a request to all the computers of the respective subnetwork to carry out an agent advertisement. By agent solicitation, the mobile terminal MS can force the agents to reveal themselves immediately, so the waiting time is reduced considerably. Agent solicitation is also carried out where an agent advertisement fails, for example in the event of packet loss or switching network. With the aid of agent discovery, a mobile terminal MS can also establish whether it is located in its home network or in a visited network. Based on the packet information within an agent advertisement message, the mobile terminal MS identifies its home agent HA. If the mobile terminal MS receives message packets from a visited network, then it can additionally establish whether its position has changed since the last advertisement. If the mobile terminal MS does not receive an advertisement message, the mobile terminal MS initially assumes that it is located in the home network and the home agent HA is faulty. The mobile terminal MS then tries to establish contact with the router of the network in order to confirm this assumption. If the mobile terminal MS is not located in its home network, it subsequently tries to access a DHCP server and to obtain an address of the subnetwork. If this is successful, the mobile terminal MS uses this address as a so-called colocated care/of address and establishes contact with the home agent HA. The colocated care/of address is an address which is assigned to the mobile terminal MS in the visited network and is also communicated to the home agent HA.

Figure 5:
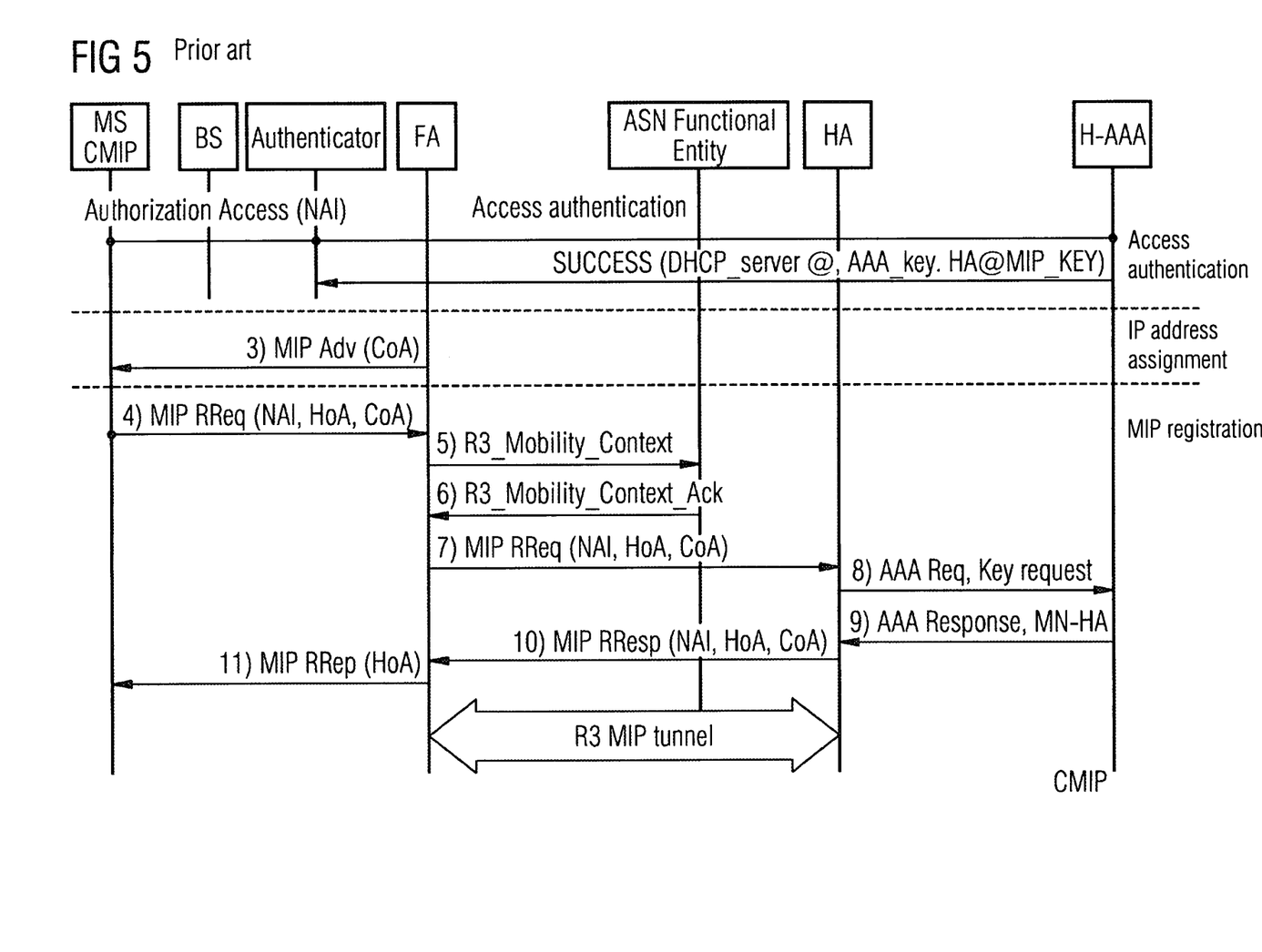
FIG. 5 is a signal diagram of a connection setup using Client Mobile IP (CMIP) according to the related art.

A distinction is made between network-based mobility management (PMIP) and terminal-based mobility management (CMIP). In terminal-based mobility management (CMIP), the terminal supports Mobile IP (MIP). FIG. 4 shows the setting up of a connection using known network-based mobility management (PMIP), while FIG. 5 represents the setting up of a connection using known terminal-based mobility management (CMIP).

When a connection is set up between the mobile terminal MS and the network, the authentication server of the home network (H-AAA), after successfully authenticating the subscriber, sends an authentication confirmation message (SUCCESS). The authentication confirmation message notifies the authentication client that authentication of the subscriber has been completed successfully.

In the case of proxy MIP or network-based mobility management (PMIP), the mobile terminal does not support Mobile IP or the corresponding MIP software is not activated in the mobile terminal MS.

In the case of client MIP (CMIP) or terminal-based mobility management on the other hand, Mobile IP is supported by the respective terminal or mobile station MS.

In proxy MIP, the mobile terminal MS recognizes only an IP address assigned by the DHCP server. The care/of address of the mobile terminal MS is known not to the mobile terminal but to the PMP client, the foreign agent FA and the home agent HA. In client MIP, on the other hand, the mobile terminal MS recognizes both its IP addresses, i.e. both the home address and the care/of address.

As can be seen from FIGS. 4 and 5, MIP registration takes place after IP address assignment. In MIP registration, the home agent HA is informed about the current location of the mobile terminal MS. To register, the mobile terminal MS or the corresponding PMIP client sends a registration request containing the current care/of address to a home agent HA. The home agent HA enters the care/of address in a list administered by it and responds with a registration reply. Since in principle any computer can send a registration request to a home agent HA, it could easily be simulated to a home agent HA that a computer or mobile terminal MS had moved into a different network. In order to prevent this, both the mobile terminal MS and the home agent HA have a shared secret key, namely a Mobile IP key (MIP-KEY).

In proxy MIP, the registration request (MIPRRQ) is transferred from a PMIP client within the access network ASN via a foreign agent FA to the home agent HA. The home agent HA has a key for the subscriber assigned to it by the relevant authentication server H-AAA and transfers this key with the MIP registration reply, as shown in FIG. 4.

In terminal-based mobility management (CMIP), the registration request message (MIPRRQ) is routed directly from the mobile terminal MS via the foreign agent FA to the home agent HA, as shown in FIG. 5.

In WiMax access networks, Proxy Mobile IP (PMIP) is used besides Mobile IP (CMIP), in order to make mobility management possible for clients which do not themselves have any Mobile IP client functionality. In PMIP, a Proxy Mobile IP client, which carries out the MIP signaling on behalf of the client, is provided in the access network. These mobility protocols are used in WiMax for a handover between two access networks ASN or between two network access providers NAP. Here, the relevant WiMax home agent may be located optionally in a WiMax home network HCSN or in a visited WiMax network (VCSN). It is assumed in WiMax that a home AAA server is located in the home network HCSN, which knows the long-term cryptographic keys shared with the user as well as further usage parameters.

During registration, the WiMax home agent requests security parameters, for example temporary cryptographic keys, from the WiMax home AAA server. These are needed so that only one authorized client can register with the home agent and in order to protect the MIP signaling. As part of the authentication and key agreement protocol which the mobile terminal executes with the authentication server, the mobile terminal can also derive these security parameters itself. In a WiMax access network, an AMSK or Mobile IP root key (MIP-RK) is derived from the EMSK key (extended master session key) and provided. From this Mobile IP root key further keys are then derived for protecting the different communication pathways between the mobile node or the foreign agent FA and the home agent HA. Here, the different mobile IP variants such as mobile IP V6 and mobile IP V4 are derived through separate keys respectively for Client Mobile IP and Proxy Mobile IP.

In known WiMax access networks, interworking or collaboration with networks of different types is not supported.

Figure 6:
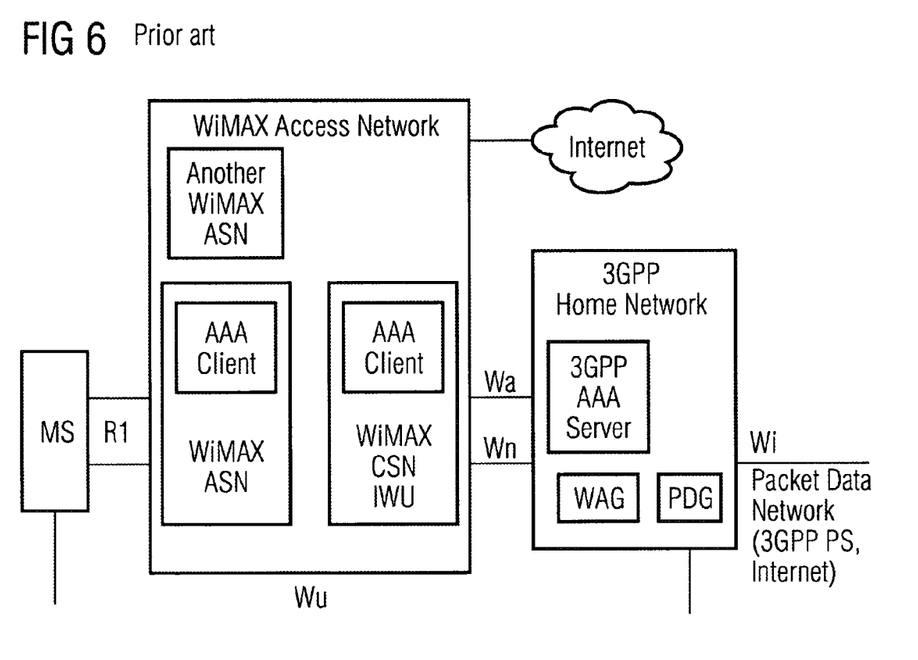
FIG. 6 is a block diagram representing the interworking between a WiMax access network and a 3GPP network according to the related art.

FIG. 6 shows the interworking between a WiMax access network and a 3rd Generation Partnership Project (3GPP) home network according to the related art. As can be seen from FIG. 6, in the WiMax access network an authentication proxy server (AAA-Relay) is provided which has an interworking unit (IWU) as an interface to the 3GPP home network. When interworking with the 3GPP network, the authentication proxy server takes over the key generation and key derivation which are necessary as part of the logging on of the subscriber onto the network, in order to activate Proxy Mobile IP for the subscriber or the mobile terminal. In the case of Proxy Mobile IP, a Proxy Mobile IP client is located in the ASN gateway or authentication proxy server of the WiMax home network WiMax-CSN. This WiMax home network WiMax-CSN is connected to the 3GPP network, as can be seen in FIG. 6. With Proxy Mobile IP, it is therefore possible for the interworking unit IWU to generate a mobile IP key (MIP-Key) when logging on to a network in order to safeguard the pathway between the Proxy Mobile IP client and the home agent. Here, the Proxy Mobile IP client may be located in the ASN gateway and consequently forms part of the access network infrastructure. It is not therefore necessary in the case of Proxy Mobile IP to modify the 3GPP authentication server, and the 3GPP authentication server does not have to comply with the specifications of the WiMax access network.

In Client Proxy Mobile IP, however, interworking between the WiMax access network and the 3GPP home network is not supported. No suitable protocols currently exist for forwarding security parameters to the client or the mobile terminal. The reason for this is that, in the known procedure, the mobile terminal derives these security parameters from the authentication and key agreement protocol.

SUMMARY

Therefore, it is desirable to establish a method and a system for providing an access-specific key for safeguarding a data transfer between a mobile terminal and a node of an access network, which also enable Client IP (CMIP) if the authentication server of the home network does not support mobility management.

Described below is a method for providing an access-network-specific key for safeguarding a data transfer between a mobile terminal and a node of an access network, wherein, during authentication of the mobile terminal, an authentication server generates a session key from which a base key is derived and transferred to an interworking proxy server which from the transferred base key derives the access-network-specific key and provides it to the node of the access network.

In an embodiment, the session key is formed by an MSK (master session key) or by an EMSK (extended master session key).

In the method, a local master session key (MSK or EMSK), which for security reasons must not leave the authentication server (AAA) of the home network, is used in order to derive therefrom a pseudo or base key which is then transferred to an interworking proxy server, the interworking proxy server deriving from the received base key the necessary access-specific key according to the predetermined key hierarchy and providing it for the respective nodes of the access network.

In an embodiment the authentication server is located in a home network of the mobile terminal.

In an embodiment method, the base key is derived from the session key by a predetermined first derivation function.

This first derivation function may be a hashed message authentication code (HMAC) secure hash algorithm or message digest 5 algorithm formed by an HMAC-SHA1, HMAC-SHA256, HMAC-MD5, SHA1, SHA-256 or an MD5 derivation function.

In an embodiment method, derivation of the base key is effected as a function of the session key and a character string.

In an embodiment method, authentication of the mobile terminal by the authentication server is effected by an extensible authentication protocol (EAP).

In a further embodiment method, authentication of the mobile terminal by the authentication server is effected by a Universal Mobile Telecommunications System-Authentication and Key Agreement (UMTS-AKA) protocol.

In an alternative embodiment method, authentication of the mobile terminal by the authentication server is effected by a Hypertext Transfer Protocol-Digest-Authentication and Key Agreement (HTTP-Digest-AKA protocol).

In a further embodiment method, the transfer of data between the authentication server and the interworking proxy server is effected by a Diameter or a Radius protocol.

In an embodiment method, the access network is formed by a WiMax network.

In an embodiment method, the home network is formed by a 3GPP network.

In an embodiment method, a Mobile IP root key is derived by the interworking proxy server from the transferred base key by a second derivation function.

Here, the second derivation function may be formed by an HMAC-SHA1, HMAC-SHA256, HMAC-MD5, SHA1, SHA-256 or an MD5 derivation function.

In an embodiment method, the access-specific key for securing a data transfer between the mobile terminal and the node of the access network is derived from the derived Mobile IP root key by a third derivation function.

This third derivation function may be an HMAC-SHA1, HMAC-SHA256, HMAC-MD5, SHA1, SHA-256 or an MD5 derivation function.

In an embodiment method an appropriate access-specific key is derived for each of the various data transfer paths between the node of the access network and the mobile terminal.

In an embodiment method, the mobile terminal also generates the session key during authentication and derives therefrom the access-specific key.

Also described below is an authentication server for providing a base key, from which an access-specific key for securing a data transfer pathway between a mobile terminal and the node of an access network can be derived, the authentication server generating during authentication of the mobile terminal a session key and deriving therefrom by a derivation function the base key and providing it to an interworking proxy server.

Also described below is an interworking proxy server for providing an access-specific key for securing a data transfer between a mobile terminal and a node of an access network, the interworking proxy server deriving the access-network-specific key from a base key transferred by an authentication server and providing it to the node of the access network.

Also described below is a data transfer system using a plurality of access networks and at least one home network of the mobile terminal, an authentication server of the home network generating during authentication of a mobile terminal a session key and deriving therefrom a shared base key which is transferred to the access networks which each have an interworking proxy server which derives at least one access-specific key from the transmitted base key which is provided respectively for securing a data transfer pathway between the mobile terminal and a node of the respective access network.

BRIEF DESCRIPTION OF THE DRAWINGS

These and other aspects and advantages of the method and of the system for providing an access-network-specific key for securing a data transfer between a mobile terminal and a node of an access network will become more apparent and more readily appreciated from the following description of the exemplary embodiments, taken in conjunction with the accompanying drawings of which.

DETAILED DESCRIPTION OF THE PREFERRED EMBODIMENTS

Reference will now be made in detail to the preferred embodiments, examples of which are illustrated in the accompanying drawings, wherein like reference numerals refer to like elements throughout.

Figure 7:
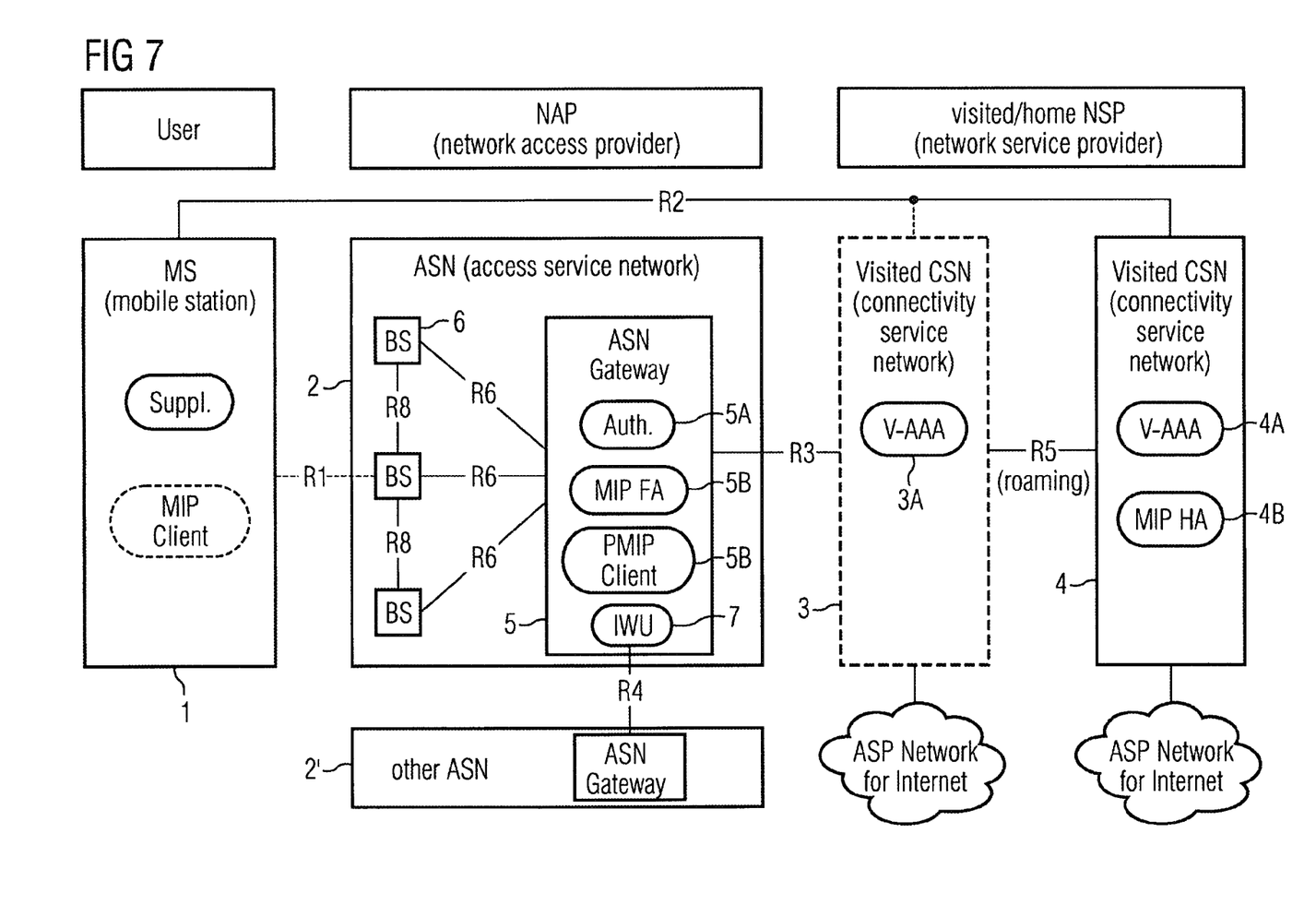
FIG. 7 is a block diagram with a possible embodiment of the system for providing an access-network-specific key.

FIG. 7 shows a network architecture in which the method for providing an access-network-specific key can be used. A mobile terminal 1 (MS=mobile station) is connected via an interface R1 to an access network 2 (ASN=access service network). The access network 2 is connected via an interface R3 to a visited network 3 (VCSN=visited connectivity service network). This visited network 3 is in turn connected via an interface R5 to a home network 4 (HCSN=home connectivity service network).

If the mobile terminal 1 moves from a first access network 2 to a second access network 2', a handover takes place between the first and the second access network. This handover is referred to in the WiMax specification as "macro mobility management" or else as "R3 mobility" or "inter ASN mobility". The visited network 3 and the home network 4 are respectively connected to a network of an access service provider (ASP) or to the Internet.

Each access network 2 contains a plurality of base stations 6 which are in turn connected via an interface R6 to an ASN gateway node 5. The ASN gateway node 5 shown in FIG. 6 illustrates an authenticator 5A, a MIP foreign agent 5B and optionally a PMIP client 5C as well as, optionally, an interworking proxy unit 7 with a programmed processor. An AAA server 3A is located in each visited network 3, as shown in FIG. 6. In the home network 4, there are also located an authentication server 4A with a programmed processor and a home agent 4B. In a possible alternative embodiment, the interworking unit 7 is located in the home network 4.

At the mobile terminal 1 end, two cases have to be differentiated. The mobile terminal 1 itself supports Mobile IP and has its own CMIP client or the mobile terminal 1 does not support Mobile IP and needs a PMIP client 5C in the gateway node 5 of the access network 2.

Figure 8:
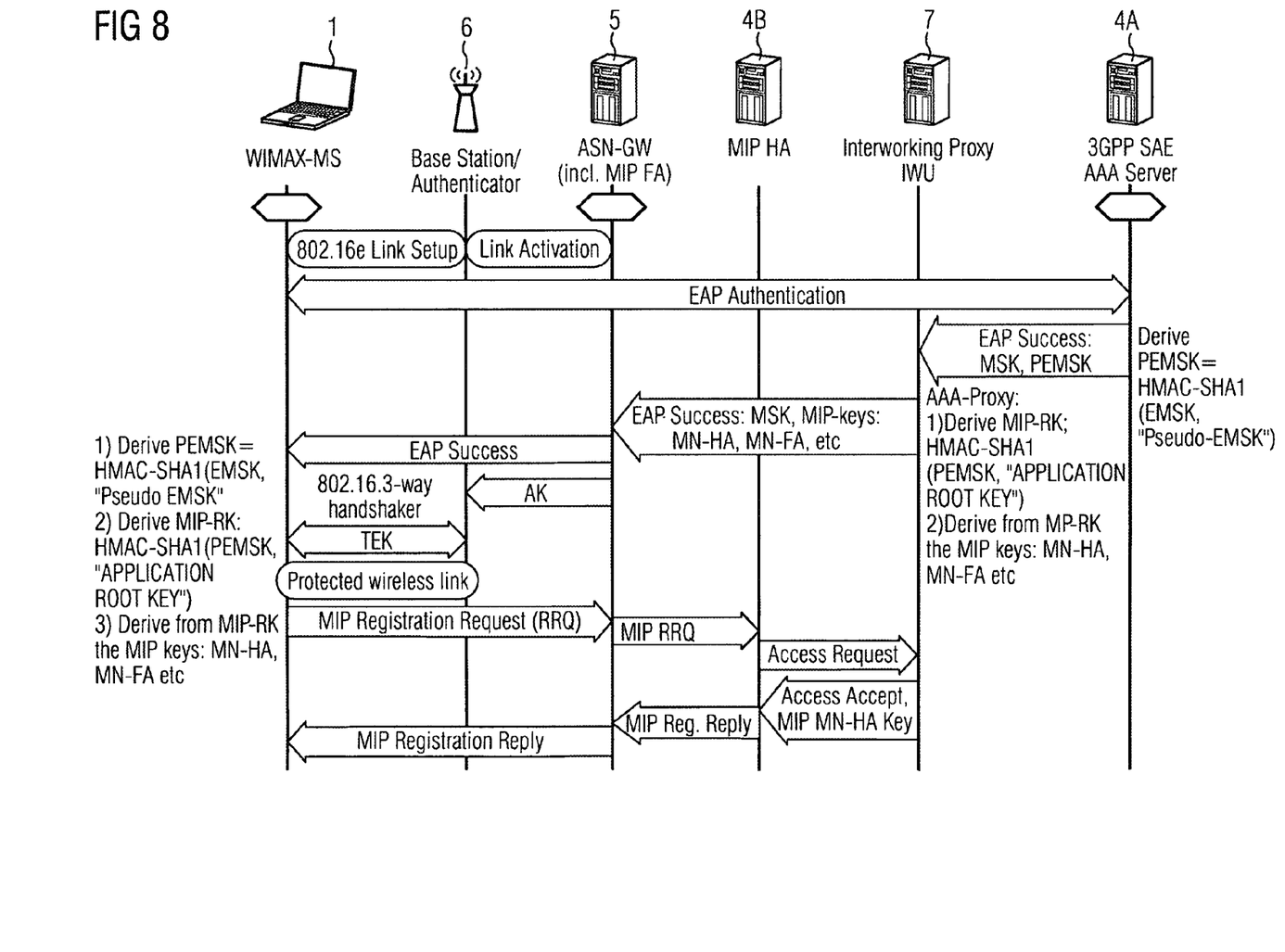
FIG. 8 is a signal diagram representing a possible embodiment of the method for providing an access-network-specific key.

FIG. 8 shows a signal diagram illustrating a possible embodiment of the method, the interworking unit 7 being located in a first embodiment in the access network 2 or in an alternative embodiment in the home network 4. In the method, an access-network-specific key for securing a data transfer between the mobile terminal 1 and any node of the access network 2 is provided, the authentication server 4A which is located in the home network 4 of the mobile terminal 4 generating during authentication of the mobile terminal 1 a session key and deriving from this session key a base key which is transferred to the interworking proxy server 7, as described in FIG. 7. The interworking proxy server 7 derives from the received base key by a derivation function the necessary access-specific key and provides it for the respective node of the access network 2. The session key from which the transferred base key is derived is in one embodiment an MSK (master session key) or an EMSK (extended master session key). As described in FIG. 8, the authentication server 4A derives from the extended master session key EMSK a pseudo EMSK or a shared base key by an HMAC-SHA1 derivation function. In an alternative embodiment, this derivation function is formed by an HMAC-SHA256, an HMAC-MD5, an SHA1, an SHA256 or an MD5 derivation function. The derived base key or pseudo key is transferred in an EAP success message together with the master session key MSK to the interworking unit 7, which is embodied for example as an interworking proxy server.

In a possible embodiment of the method, derivation of the base key or of the pseudo key PEMSK is effected as a function of the session key MSK and/or EMSK and, additionally, as a function of a character string, i.e. according to one of the variants:

PEMSK=H(MSK, EMSK, "String"),
PEMSK=H(MSK, "String"),
PEMSK=H(EMSK, "String").

In the embodiment shown in FIG. 8, authentication of the mobile terminal 1 is effected by an EAP data transfer protocol. In an alternative embodiment, authentication of the mobile terminal is effected by an authentication server 4A by a UMTS-AKA protocol or by an HTTP-Digest-AKA protocol. Data transfer between the authentication server 4A and the interworking proxy server 7 may use a Diameter or Radius protocol.

The derived base key or pseudo key represents an intermediate stage in the key hierarchy. This base key can, as a shared base key, also be transmitted to various interworking proxy servers 7 which are provided in various access networks 2. The access networks 2 are for example WiMax networks. The home network 4 in which the authentication server 4a is located is, for example, a 3GPP network.

As soon as the interworking proxy server 7, as can be seen in FIG. 8, has received the transferred base key PEMSK, it forms by a second derivation function a Mobile IP root key IMP-RK. The second derivation function can also be an HMAC-SHA1, HMAC-256, an HMAC-MD5, an SHA1, an SHA256 or an MD5 derivation function. In further embodiments, different derivation functions or cryptographic key derivation functions KDF can also be used. From the Mobile IP root key MIP-RK thus derived, further access-network-specific keys for securing a data transfer between the mobile terminal 1 and a node of the access network 2 can be derived in accordance with the key hierarchy. This third derivation function can also be, for example, an HMAC-SHA1, HMAC-256, an HMAC-MD5, an SHA1, an SHA-256 or an MD5 derivation function The Mobile IP root key MIP-RK is used in order to generate therefrom application keys or access-network-specific keys, for example:

MN-HA-MIP4=H(MIP-RK, "String"|HA-IP)
MN-HA-CMIP6=H(MIP-RK, "String"|HA-IP)
MN-FA=H(MIP-RK, "String"|FA-IP) AND
FA-H=H(MIP-RK, "String"|FA-IP|HA-IP|NONCE).

The character "|" stands for the concatenation of the substrings.

Here, the key derivation can also be modified such that for PMIPV4 and CMIPV4 separate keys are derived, for example:

MN-HA-CMIP4=H(MIP-RK, "CMIP4MNHA"|HA-IP)
MN-HA-PMIP4=H(MIP-RK, "PMIP4MNHA"|HA-IP).

For each of the various data transfer pathways between nodes of the access network 2 and the mobile terminal 1, an appropriate access-network-specific key can be derived in this manner from the Mobile IP root key which in turn is derived from the transmitted base key.

In the method, the previous key derivation as part of an EAP-based network logon of a subscriber is upgraded such that the interworking proxy server 7 provides the access network with CMIP-suitable keys which can, if necessary, also be used for PMIP. In the method, the base key or the pseudo key is derived by the authentication server from the MSK and/or the EMSK and/or further input, for example a character string, by a suitable key derivation function KDF.

Figure 9:
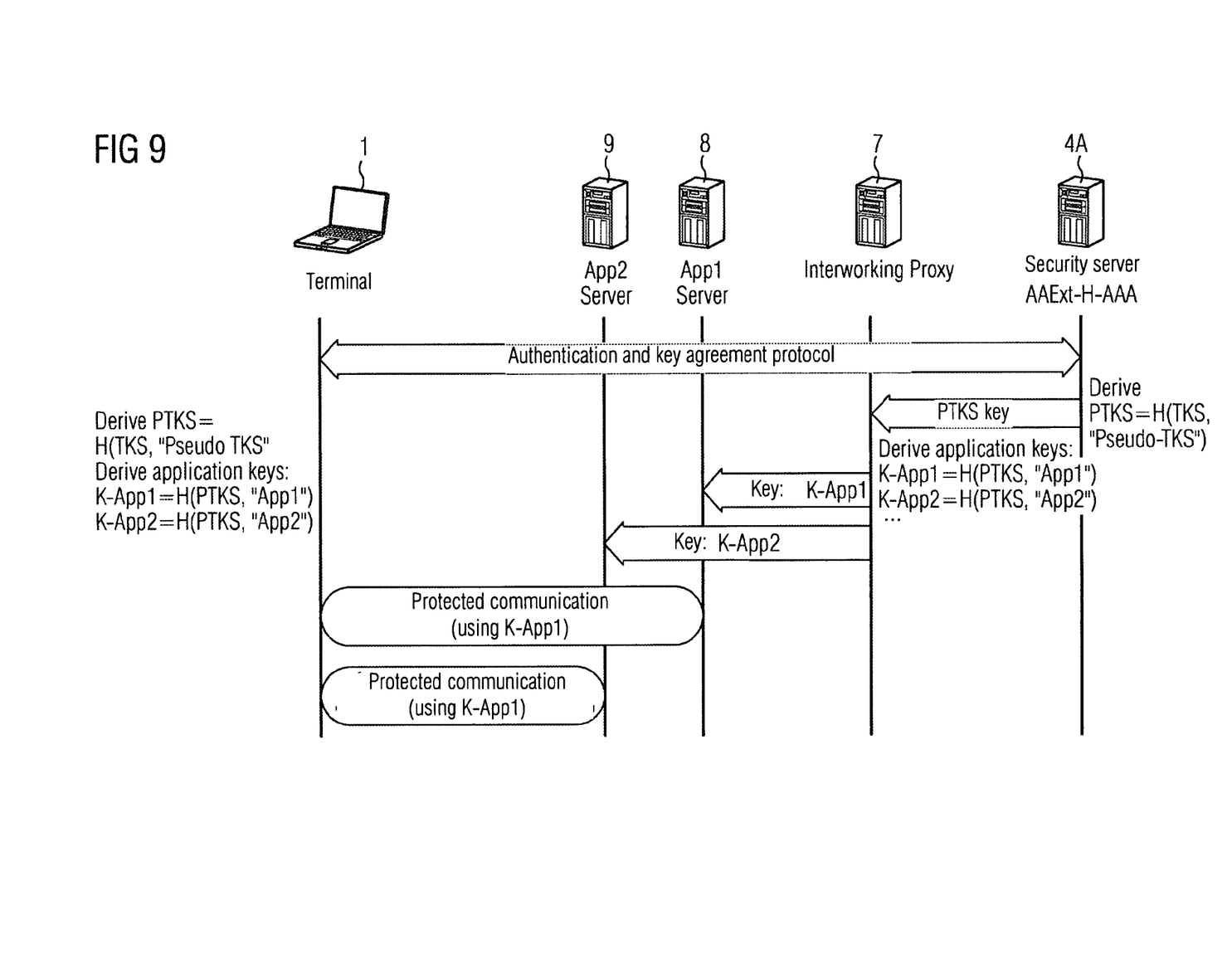
FIG. 9 is a further signal diagram representing a possible embodiment of the method for providing an access-network-specific key.

FIG. 9 shows a signal diagram to illustrate the principle underlying the method. During authentication of a mobile terminal 1 by an authentication and key-agreement protocol, for example EAP based on Radius or Diameter, a security server or an authentication server 4A generates in a first network a base key or a pseudo key PTKS or a pseudo-temporary cryptographic key based on the temporary cryptographic key TKS, for example a master session key MSK or EMSK. The pseudo key derived with a derivation function is then transferred to an interworking proxy server 7 which is located for example in a second network, an access-network-specific key being derived in turn for each application server or node 8, 9 from a further derivation function. Each application server 8, 9 then receives the access-specific key derived for it from the interworking proxy server 7. The data transfer pathway between the terminal 1 and the respective application server 8, 9 is then cryptographically protected by the transferred key.

With the method, it is possible to use authentication servers, for example WLAN or 3GPP servers for WiMax access networks, the authentication servers not having to provide the CMIP/PMIP functionality expected by the WiMax access network, but having merely to be upgraded with the functionality for deriving a base key from the session key. The method also offers the advantage that in the case of a WiMax access network CMIP is also supported and consequently any restriction with regard to macro-mobility is avoided. With the method, the WiMax network does not have to be modified or subjected to any further changes, apart from providing an interworking proxy server 7 in the WiMax network. The mobile terminal 1, the authentication server and the interworking proxy server 7 know which base key or pseudo key they are using. This makes it possible for different MIP keys (bootstrapping variants) to be supported within the WiMax network. In the method, key material which originates for example from a 3GPP network is transformed into key material for the WiMax network, the WiMax networks being able to use the key formed without any adaptation being made.

In an embodiment of the method, the authentication functionality is established outside the WiMax network, for example in the 3GPP network. The method enables future WiMax-3GPP interworking without restrictions in the WiMax network having to be conceded. A further advantage of the method is that it can easily be upgraded for interworking between various networks and for providing keys for any applications. In the method, only the interworking proxy server 7 has to know which application-specific keys have to be provided and how these are to be derived. With the method, it is not therefore necessary for the home authentication server to be able to generate the keys needed for each of the different networks connected. Accordingly, it is relatively simple with the method to connect different networks flexibly to the home network.

In the method, the mobile terminal 1 also generates the session key during authentication and derives in a corresponding manner the access-network-specific key.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for providing an access-network-specific key for securing a data transfer between a mobile terminal and a node of an access network, comprising:
   generating, during authentication of the mobile terminal by an authentication server, a session key from which a base key is derived;
   transferring the base key from the authentication server to an interworking proxy server;
   deriving the access-network-specific key from the base key by the interworking proxy server; and
   providing the access-network-specific key from the interworking proxy server to the node of the access network.

2. The method as claimed in claim 1, wherein the session key is formed by a master session key or an extended master session key.

3. The method as claimed in claim 1, wherein the authentication server is located in a home network of the mobile terminal.

4. The method as claimed in claim 1, wherein the base key is derived by a first derivation function.

5. The method as claimed in claim 4, wherein the first derivation function is a hashed message authentication code (HMAC) secure hash algorithm or message digest 5 algorithm formed by one of an HMAC-SHA1, HMAC-SHA256, HMAC-MD5, SHA1, SHA-256 and MD5 derivation function.

6. The method as claimed in claim 1, wherein the base key is derived using a function of the session key and a character string.

7. The method as claimed in claim 1, wherein the access network is formed by a WiMax network.

8. The method as claimed in claim 1, wherein the home network is formed by a 3rd Generation Partnership Project network.

9. The method as claimed in claim 1, wherein said deriving by the interworking proxy server includes obtaining a Mobile Internet Protocol root key from the base key using a second derivation function.

10. The method as claimed in claim 9, wherein the second derivation function is a hashed message authentication code (HMAC) secure hash algorithm or message digest 5 algorithm formed by one of an HMAC-SHA1, HMAC-SHA256, HMAC-MD5, SHA1, SHA-256 or MD5 derivation function.

11. The method as claimed in claim 10, wherein said deriving of the access-network-specific key for securing data transfer between the mobile terminal and the node of the access network includes operating on the Mobile Internet Protocol root key using a third derivation function.

12. The method as claimed in claim 11, wherein the third derivation function is a hashed message authentication code (HMAC) secure hash algorithm or message digest 5 algorithm formed by one of an HMAC-SHA1, HMAC-SHA256, HMAC-MD5, SHA1, SHA-256 or an MD5 derivation function.

13. The method as claimed in claim 1, wherein said deriving obtains an appropriate access-network-specific key for each of various data transfer pathways between nodes of the access network and the mobile terminal.

14. The method as claimed in claim 1, further comprising during the authentication, the mobile terminal generating the session key and deriving therefrom the access-network-specific key.

15. A data transfer system used with a mobile terminal, comprising:
   a plurality of access networks and at least one home network of the mobile terminal;

an authentication server of the home network, during authentication of a mobile terminal, generating a session key, deriving a shared base key from the session key and transferring the shared base key to the access networks; and interworking proxy servers, each in a respective access network, deriving from the base key at least one access-network-specific key respectively provided for securing a data transfer pathway between the mobile terminal and a node of the respective access network.

16. The data transfer system as claimed in claim 15, wherein said interworking proxy server, for each node of the respective access network, derives an appropriate access-network-specific key from the base key.

* * * * *